United States Patent

[11] 3,627,100

[72] Inventors Gerald W. Bourbina;
Robert W. Kluck; Richard Skarin; Norman O. Krenke, all of Saginaw, Mich.
[21] Appl. No. 77,879
[22] Filed Oct. 5, 1970
[45] Patented Dec. 14, 1971
[73] Assignee Baker Perkins Inc.
Saginaw, Mich.

[54] REORIENTING PAN TRANSFER SYSTEM
15 Claims, 5 Drawing Figs.

[52] U.S. Cl. .................................................. 198/21, 198/34
[51] Int. Cl. ........................................... B65g 47/26, B65g 47/42
[50] Field of Search ........................................ 198/21, 27, 34, 20

[56] References Cited
UNITED STATES PATENTS
2,295,526 9/1942 Bee ............................... 198/21

Primary Examiner—Edward A. Sproka
Attorney—Learman & McCulloch

ABSTRACT: High-speed transfer apparatus for transferring articles, such as pans or pansets of dough which may be proceeding lengthwisely on an endless delivery conveyor, to a pair of laterally spaced-apart, parallel receiving conveyors, extending generally crosswisely to the delivery conveyor, in such a manner that the articles may be reoriented to proceed in a broadside manner. A vertically movable transfer conveyor extends generally in line with the delivery conveyor for receiving articles therefrom and mounts a support plate adjacent the discharge end thereof which is capable of movement between the laterally spaced-apart-receiving conveyors to a position suitable for receiving articles from the transfer conveyor. Apparatus is provided for raising the transfer conveyor and support plate from a lowered position to a raised position above the upper surface of the receiving conveyors so that articles traveling on the transfer conveyor are transferred to the support plate, and for lowering the transfer conveyor and support plate from the raised position to a lowered position to deposit the articles gently on the receiving conveyors.

INVENTORS
GERALD W. BOURBINA
ROBERT W. KLUCK
RICHARD SKARIN
NORMAN O. KRENKE
BY *Learman & McCulloch*
ATTORNEYS

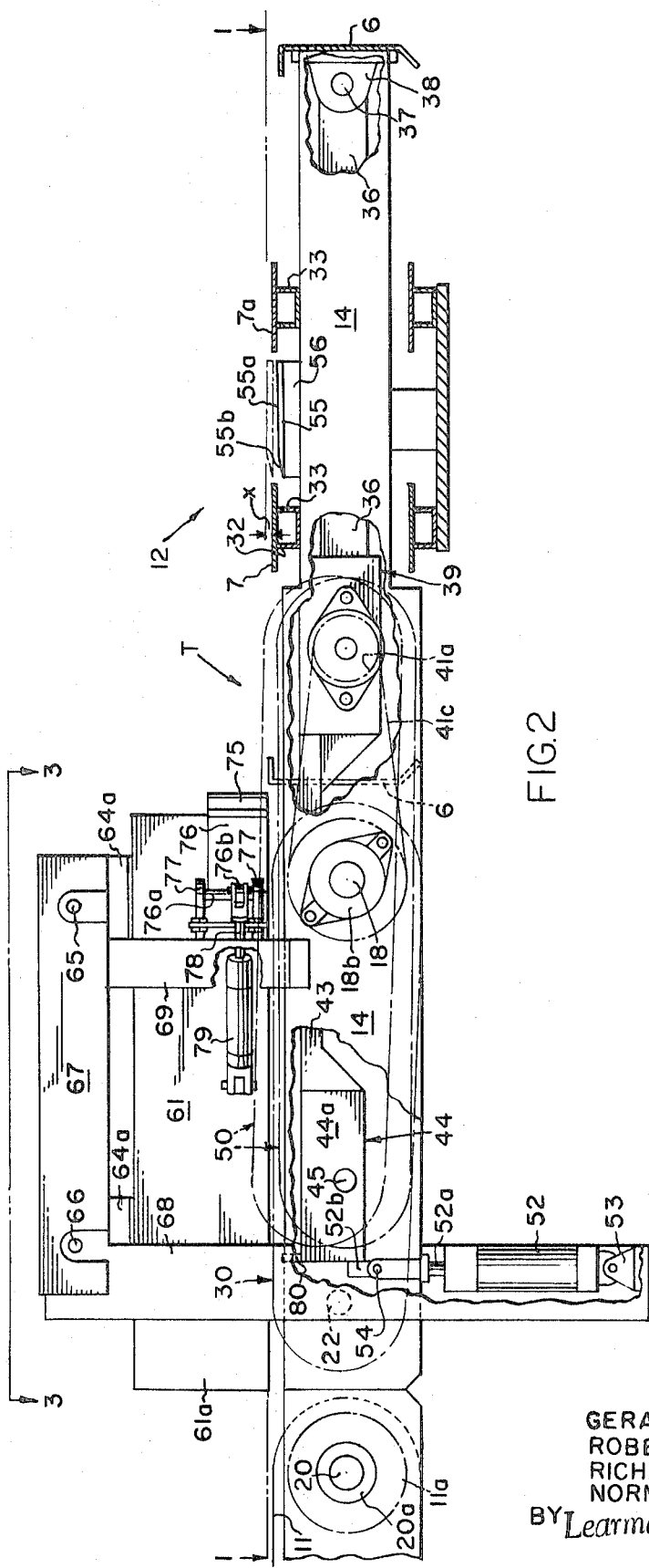

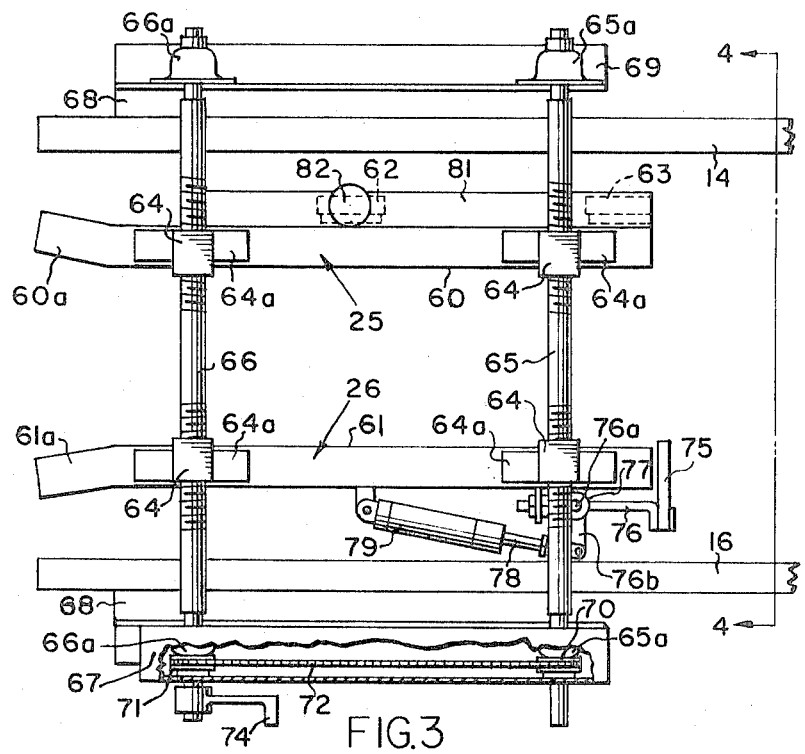

REORIENTING PAN TRANSFER SYSTEM

This invention relates to transfer apparatus for moving articles, such as pans of dough, between angularly extending conveyors so as to reorient the articles relative to the path of travel on the respective conveyors, and more particularly, to apparatus for transferring articles to a pair of longitudinally extending, laterally spaced-apart conveyors lying generally crosswisely to the path of travel of the articles.

In the bakery product processing art, dough to be processed is conventionally placed in pans or pansets which are transferred from one baking processing station to another, i.e. from a dough makeup unit to a proofer, by a series of angularly extending conveyors. Apparatus has been provided heretofore for transferring such articles from an endless conveyor to a roller conveyor, however, such prior art apparatus does not lend itself to a system requiring the transfer of articles to a pair of crosswisely extending, laterally spaced apart conveyors.

Accordingly, it is the prime object of the present invention to provide apparatus for smoothly transferring dough products in pans of diverse shape for handling a variety of products from an endless conveyor to a pair of crosswisely extending, laterally spaced-apart receiving conveyors with a minimum of noise, shock, and displacement of the product in the pans.

Another object of the invention is to provide transfer apparatus which can be readily adjusted to achieve a positively centered deposit of the pans on the receiving conveyors without the use of receiving conveyor stops or timers.

A further object of the invention is to provide a pan transfer system wherein the supply conveyor can deliver pans at a relatively low speed to transfer apparatus operating at a relatively high speed and delivering pans to a receiving conveyor system operating at a relatively high speed, the system permitting use of a controlling pan stop at the low speed end thereof so that the dough products proceeding, for instance, to a proofer will not be unduly jarred.

Briefly, the present invention provides for apparatus which moves articles, such as pans of dough, from one path of travel to a path of travel angularly disposed thereto to reorient the articles relative to their path of travel and includes: delivery conveyor means for conveying the articles in the first path of travel; a pair of longitudinally extending, laterally spaced apart conveyors extending generally crosswisely to the delivery conveyor means for conveying the articles in the second path of travel and having article receiving surfaces thereon; vertically movable transfer conveyor means for receiving articles from the delivery conveyor; vertically movable support means having a generally horizontally extending support surface for receiving articles from the transfer conveyor means and being mounted for movement between the laterally spaced-apart conveyors; means for raising at least one end of the transfer conveyor means and simultaneously raising the support means from a lowered position to a raised position above the article receiving conveyor surfaces so that articles traveling on the transfer conveyor means are transferred to the raised support means, and means for lowering the transfer conveyor means and simultaneously lowering the support means from the raised position to a lowered position to transfer articles from the support means to the article receiving conveyor surfaces.

Other objects and advantages of the present invention will become apparent to one of ordinary skill in the art from the following description when it is considered in conjunction with the accompanying drawings in which:

FIG. 2 is a sectional, side elevational view, taken along the line 2—2 of FIG. 1, parts also being broken away to more clearly illustrate the invention;

FIG. 3 is a fragmentary top plan view, taken along the line 3—3 of FIG. 1, particularly illustrating the pair of guides and stop member which are positioned above the transfer conveyor;

FIG. 4 is a fragmentary and elevational view, taken along the line 4—4 of FIG. 3; and FIG. 5 is a schematic diagram of a typical electrical control circuit which may be employed in the operation of the transfer apparatus.

Figure 1:
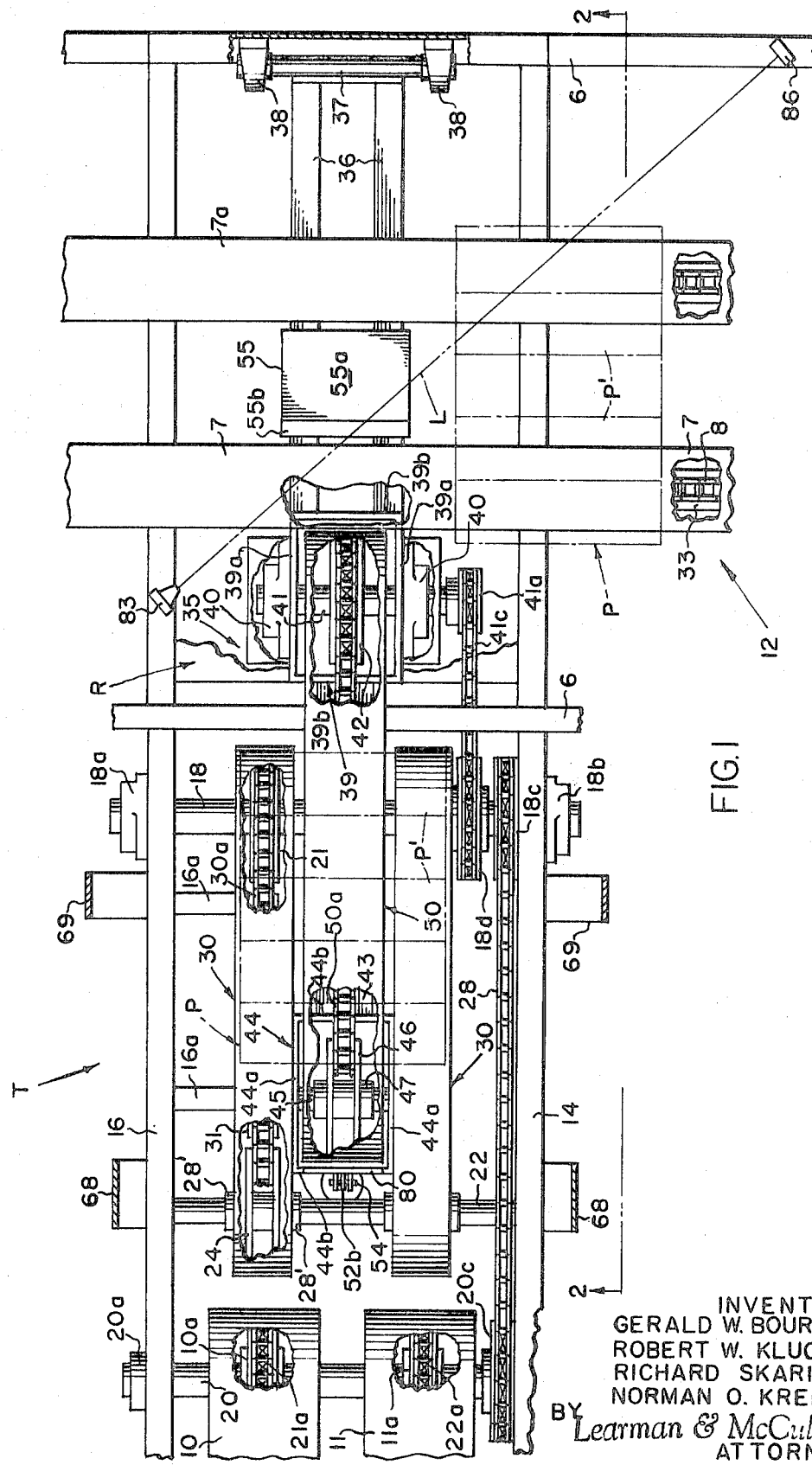
FIG. 1 is a fragmentary top plan view of transfer apparatus formed according to the invention, taken generally along the line 1—1 of FIG. 2, parts being broken away to more clearly illustrate the apparatus.

Apparatus constructed according to the disclosed embodiment of the invention is adapted for use with a conveyor system which in this case comprises a pair of infeed endless conveyors 10 and 11, leading from one bakery processing unit, and a crosswisely disposed receiving conveyor, generally indicated 12, leading to another bakery processing unit. It is between such conveyor members that a transfer unit, generally indicated by the letter T, may be positioned to gently, but without loss of control, transfer pansets, or like articles, from the pair of conveyor units 10 and 11 to the receiving conveyor unit 12.

A pair of vertically extending side frame members 14 and 16, which may be connected by suitable crossmembers (not shown) and supported on legs or the like (not shown), extend on either side of the transfer unit T and the conveyors 10 and 11. Journaled in bearings 20a provided in the side frame members 14 and 16, is a front shaft 20 mounting a pair of sprockets 10a and 11a over which the endless chains 21a and 22a for the conveyors 10 and 11 are trained. The conveyors 10 and 11 may be so-called "table top" conveyors comprising runs of hingedly connected plates which constitute a conveyor surface. Table top conveyors are well known and are illustrated in U.S. Pat. No. 1,966,659. At their rear ends, the chains 21a and 22a are trained around similar sprockets (not shown) journaled on similarly mounted shafts (not shown). It will be assumed that a motor M-1 (FIG. 5) is connected through suitable reduction gearing to the shaft 20 to drive the conveyors 10 and 11 continuously in the usual manner and thereby move pansets P continuously forwardly. The pansets P are moved to a centered position by a pair of upwardly extending guide members 25 and 26 (FIGS. 3 and 4), to be later described. Each of the pansets P in the present illustration is made up of five pans P' arranged in side-by-side relation as shown, but obviously various pans or pansets may be conveyed.

The take away conveyor 12 extends generally crosswisely to the transfer apparatus T and the conveyors 10 and 11, and includes a pair of vertically extending side frame members 6 which are connected with the side frame members 14 and 16 and journal a pair of shafts (not shown) mounting suitable sprockets (not shown) for driving a pair of endless table top conveyor members 7 and 7a in the normal manner. The conveyors 7 and 7a include drive sprocket engaging roller chains 8 mounting abutting table top conveying plate members which make up the support surfaces of the conveyors. The upper and lower runs of the conveyors 7 and 7a travel on spaced apart wear guides or strips 32 supported on U-shaped support mounts 33, which are mounted by the frame members 14 in a suitable manner. The conveyors 7 and 7a are driven by an appropriate motive source such as an electric motor $M_2$ (FIG. 5).

The transfer unit T, for transferring articles from the conveyors 10 and 11 to the conveyors 7 and 7a, includes a front drive shaft 18 journaled in a pair of bearing blocks 18a and 18b mounted on opposite side walls 14 and 16, respectively, and a rear shaft 22 fixed in the side walls 14 and 16 and journaling a pair of rotatable idler sprockets 24 which are axially located by collars 28' fixed to the shaft 22. A pair of driving sprockets 21 are fixed to the drive shaft 18 in the usual manner. Endless conveyors, generally designated 30, include sprocket engaging roller chains 30a mounting "flat top" article supporting plate members, which are trained around the driving sprockets 21 and the idler sprockets 24. Pairs of frame supported guides or wear strips, schematically shown at 31, are mounted by track support members 16a between the sprockets 21 and 24, and below the upper and lower runs of the conveyors 30, for the chains 30a. It will be noted that the conveyors 30 are generally longitudinally in alignment with the conveyors 10 and 11 to receive pansets P therefrom.

Mounted on the shafts 20 and 18 are a pair of sprockets 20c and 18c respectively, which have a drive chain 28 trained therearound. The relative sizes of the sprockets 20c and 18c are such that the linear speed of the conveyors 30 is higher than that of the conveyors 10 and 11. For example, when the linear velocity of conveyors 10 and 11 is 105 feet per minute, the linear speed of conveyors 30 may be 138 feet per minute.

For transferring the pansets P gently from the conveyors 30 to the conveyors 7 and 7a, in a manner which precludes jamming, the transfer apparatus T is provided with a delivery conveyor assembly, generally designated 35, which is supported by a pair of elongate support members 36 each fixed at one end to a shaft 37 journaled in bearings 38 which are fixed to the outer side frame 6 of the conveyor 12. The opposite ends of the members 36 rigidly support a rectangularly shaped housing 39 (FIG. 1) having side walls 39a and front and rear walls 39b. A pair of bearing blocks 40 are mounted on the side walls 39a and journal a drive shaft 41 to which is keyed a drive sprocket 42.

One end of each of a pair of elongate frame members 43 is rigidly connected to the rear wall 39b of the housing 39. The opposite ends of the members 43 support a second rectangularly shaped housing 44 having side walls 44a and front and rear walls 44b. A shaft 45 is fixed on the side walls 44a and journals an idler sprocket 46 which is located axially by collars 47 fixed to the shaft 45. An endless table top conveyor, generally designated 50, including an endless roller drive chain 50a, is trained around the drive and idler sprockets 42 and 46. For driving the shaft 41, sprockets 41a and 18d are fixed to the shafts 41 and 18 respectively, and a drive chain 41c is trained therearound. The diameter of the sprocket 18d is considerably larger than that of the sprocket 41a so that the linear speed of conveyor 50 is faster than that of the conveyors 30. For example, when the speed of the conveyors 30 is 138 feet per minute, the speed of the conveyor 50 may be 195 feet per minute.

For pivoting the delivery conveyor assembly 35 about the shaft 37 to raise and lower it for a purpose which will presently be made clear, a double acting, fluid pressure operated, solenoid controlled cylinder 52 (FIG. 2) is pivotally connected to a fixed frame member 53 and includes a piston rod 52a pivotally connected at 54 with trunnions 52b fixed to the rear wall 44b of the housing 44. As the piston rod 52a is moved upwardly by the cylinder 53, the conveyor 50 is moved upwardly to gently lift the pansets P off the conveyors 30 and move them forwardly towards conveyors 7 and 7a. By raising the conveyor 50 upwardly, the path of travel of the pansets P is such that a slight clearance X (FIG. 2) exists between the bottom of the pansets P and the top of the conveyor 7 as the pansets P are discharged off the conveyor 50. Supported substantially flush with the upper surface of conveyor 50 are outrigger plates R which connect to the frame side walls 39a.

To receive the pansets P as they pass over the conveyor 7, a dead plate 55 is mounted on a pair of support plates 56 fixed to members 36 for vertical movement therewith. As the pansets P pass over the conveyor 7, they are supported on the dead plate 55 (in the chain line position in FIG. 2) at a level above the upper surface of the conveyors 7 and 7a so that movement of the panset P is not interrupted as the leading edge thereof passes over the conveyor 7. When the leading edge of the panset P passes beyond the conveyor 7a, the piston rod 52a of cylinder 52 is moved downwardly to lower the delivery conveyor assembly and move the plate 55 from the chain line position, shown in FIG. 2, to the full line position, also shown in FIG. 2, so that the upper surface of the plate 55 is below the upper surface of the conveyors 7 and 7a and the panset is centered with respect to the conveyors 7 and 7a when it comes to rest thereon. Thus, the pansets P will be deposited on the conveyors 7 and 7a, and will be transferred therealong for further processing at another station.

As shown in FIG. 2, the top surface 55a of the dead plate 55 is inclined upwardly in a forward direction when the plate 55 is in the lower position shown in full lines so that when the plate 55 is moved to the position shown in chain lines, the upper surface 55a is disposed substantially in a horizontal plane. Also, rearward edge portion 55b of the plate 55 increases gradually in thickness and so is also inclined upwardly in a forward direction, to prevent the leading edge of the panset from ever being jammed against the edge of the plate 55.

As shown particularly in FIGS. 2-4, the pan guide members, generally designated 25 and 26, of the transfer unit T include a pair of nonmagnetic pan guide plates 60 and 61 having rearwardly flared rear end portions 60a and 61a. Nut members 64, fixed to the members 60 and 61 by channel mounts 64a, are threaded to receive front and rear threaded adjusting shafts 65 and 66 which are journaled in bearings 65a and 66a which are supported by front and rear pairs of upwardly extending side frame members 68 and 69 fixed to the side frame members 14 and 16.

Fixed on the shafts 65 and 66 are sprockets 70 and 71, respectively, which connect the shaft 65 with the shaft 66 via a chain 72 and, as shown in FIG. 3, a handle 74 is fixed on the outer end of the shaft 66 to facilitate manual rotation of the shafts 65 and 66. The threaded portions on the shafts 65 and 66 at opposite ends are of opposite hand so that upon rotation of the shafts 65 and 66, the guides 25 and 26 will be moved together, inwardly or outwardly as desired, depending upon the direction the handle 74 is rotated. A guard housing 67 is provided for the chain 72.

Mounted on the front portion of the pan guide plate 61 is a pan stop 75, fixed to one end of a bell crank 76 which includes a vertically extending pin 76a pivotally mounted on a pair of vertically spaced bearings 77 (FIG. 2). The other end 76b of the bell crank 76 is pivotally connected with the piston rod 78 of a double-acting, solenoid operated, pneumatic cylinder 79 which is pivotally mounted on the pan guide plate 61. The stop 75 is formed of material such as "nylon" to minimize the sound which results when a panset moves into engagement with it.

A stop member 80 is also fixed on the rear end 44b of the box 44 and it will be observed from an inspection of FIG. 2 that, when the conveyor assembly 35 is in the "down" position, stop 80 is disposed below the level of the upper surfaces of the conveyors 30 and 50. The specific function of stop 80 will become apparent when the operation of the transfer apparatus is later described in detail.

On the front and intermediate portions of a bracket 81 fixed to the opposite pan guide plate 60 is a pair of longitudinally spaced magnetic field producing proximity sensing devices 62 and 63. When the pansets P, which are formed of steel or another magnetic material, are moved to a position adjacent one of the sensing devices 62 and 63, the intensity of the magnetic field of the respective device 62 or 63 increases and is operable to actuate switches associated with the devices 62 and 63. More particularly, when a panset P is adjacent the first encountered device 62, the strength of the magnetic field of the device 62 increases and is operable to close the normally open contacts 62a and open the normally closed contact 62b (see FIG. 5). When a panset is adjacent the second encountered magnetic field producing device 63, the strengthened magnetic field is operable to close the normally open switch contacts 63a and 63b and open the normally closed contacts 63c (see FIG. 5). Sensor heads of the type manufactured by Microswitch Division of Minneapolis Honeywell in Freeport, Illinois as Model No. 16 FS1 used in combination with AND circuit control mechanism also manufactured by the Microswitch Division as Model No. 68 FL1, have been found suitable for this purpose. The front sensing device 63 is stationarily mounted whereas the rear sensing device 62 is adjustably movable on the bracket 81 by means of an adjustable positioning knob 82.

A conventional electric eye assembly is provided and includes a light source 83 supported on the front end portion of the side frame channel 16 and a photoelectric cell 86 mounted on the outer support channel 6 of the conveyor unit 12. The specific function of the electric eye unit 86, will also be explained during the detailed description of the operation of the transfer apparatus of the invention and it is to be understood that the cell 86 has a relay switch 86a (FIG. 5) operable upon the breaking of the light beam L.

Referring now to FIG. 5, a typical electrical control circuit for operating the apparatus illustrated in FIGS. 1-5 is schematically depicted and includes a pair of lines L-1 and L-2 connected across a suitable source of electrical power such as 110 v., 60 cycle, AC. The motors $M_1$ and $M_2$ for continually driving the conveyors 10 and 11 and 7 and 7a are connected in lines L-10 and L-11 across the lines L-1 and L-2. The proximity sensing devices 62 and 63 are connected in lines L-3 and L-4 across the source. The normally open contacts 62a and 63a of proximity devices 62 and 63 are connected in line L-6 across the lines L-1 and L-2 in series with the advance or raise solenoid 52a of the cylinder 52, the normally closed contacts 86a of the electric eye 86, and normally open contacts C-2 of a switch in a conventional "Gemco" cam operated switching mechanism (not shown) which includes a cam G-1 driven by the motor $M_2$ in the usual fashion for actuating the switch C1. The normally closed contacts 62b of proximity device 62 are connected in line L-7 in series with the retract or lowering solenoid 52b of the cylinder 52. The contacts 86a open when the light beam transmitted from the source 83 is interrupted. A retract solenoid 79a, for withdrawing the stop 75, is connected in series with the normally open contacts 63b of the proximity device 63 in line L-8 and a second set of normally open "Gemco" switching contacts C2, which are also closed by the cam G1. An advance solenoid 79b for moving the stop 75 to the pan interrupting position shown in FIG. 2 is connected in series circuit with the normally closed contacts 63c of the proximity device 63 in line L-9 across the lines L-1 and L-2.

THE OPERATION

In operation, pansets P feed from the continuously operating endless conveyors 10 and 11 to the continuously operating endless conveyors 30. The pansets P may proceed forwardly on the conveyors 30 until they are halted by the stop 75. However, just before a panset reaches the stop 75, the proximity switches 62 and 63 are actuated to close the normally open contacts 62a, 63a and 63b, and open the normally closed contacts 62b and 63c. If, at this time, the cam operated contacts C2 (line L-8) are closed, the solenoid 79a is energized and the stop 75 is pivoted to its retract position. Simultaneously, if at this time the light beam L remains uninterrupted to indicate that the portions of conveyors 7 and 7a forward of conveyor units 10 and 11 are clear, the normally closed contacts 86a (line L-6) remain in the closed position, and the advance solenoid 52a of the cylinder 52 is energized when the switch C1 is closed by the cam G1. At the same time, opening of the normally closed contacts 62b of the limit switch 62, and the normally closed contacts 63c of the proximity switch 63, deenergizes the solenoids 82b and 79b. Thus, the piston rod of the cylinder 52 is moved upwardly to pivot the delivery conveyor assembly 35 about the shaft 37. Since the conveyor 50 travels continuously, when the delivery conveyor assembly 35 is in the raised position, the pansets P are transferred from the conveyor 50 to the dead plate 55 which has also been raised to a position above the inner conveyor belt 7 as shown in chain lines in FIG. 2. The bottom of the leading edge of the panset P engages the upper surface of the dead plate 55 as the conveyor 50 continues to drive the panset P forwardly toward the right as viewed in FIG. 2. As soon as the trailing edge of the panset P is beyond the influence of the magnetic field proximity switch 62, the contacts 62a will open to deenergize the solenoid 52a, and the contacts 62b will close to energize the solenoid 52b and lower the conveyor assembly 35 from the chain line position to the full line position shown in FIG. 2. As the conveyor assembly 35 lowers, the dead plate 55 also lowers to deposit the pansets P gently on the upper runs of the conveyors 7 and 7a. At the time the dead plate 55 is lowered, the panset P has been transferred to a position such that it will be centered with respect to the conveyors 7 and 7a as it comes to rest thereon. The time when the panset P is lowered is controlled by adjusting the position of the rear sensing device 62 to obtain the desired "centering."

Once the piston rod 52a has been moved to advanced position, the delivery conveyor subassembly 35 of the transfer unit T will remain raised even though the beam L is broken by the pansets P being delivered by the conveyor 50. Reopening of the contacts 86a will, of course, not operate to return the piston rod of cylinder 52 since energization of the retract solenoid 79b is required for this. During the time that the panset P is moving forwardly on the delivery conveyor 50, the stop 80 prevents following pansets from moving forwardly as it moves to the chain line position shown in FIG. 2.

Since it is obvious that many changes and modifications can be made in the above-described details without departing from the nature and spirit of the invention, it is to be understood that the invention is not limited to the details except as set forth in the appended claims.

We claim:

1. In combination:
   delivery conveyor means for conveying articles in a first path of travel;
   longitudinally extending receiving conveyor means disposed angularly to the delivery conveyor means for conveying articles in a second path of travel and including a pair of laterally spaced conveyors having article receiving surfaces thereon; and
   transfer apparatus for transferring articles from said delivery conveyor means to said receiving conveyor means to reorient the articles relative to their path of travel comprising:
   vertically movable transfer conveyor means for receiving articles from said delivery conveyor means and discharging them to a position above said receiving conveyor means;
   vertically movable support means, for receiving articles discharged by said transfer conveyor means, mounted for movement between said laterally spaced apart conveyors from a lowered position to a raised position above said article receiving conveyor surfaces;
   means for raising at least one end of said transfer conveyor means and simultaneously raising said support means from said lowered position to said raised position so that articles traveling on said transfer conveyor means are transferred to the raised support means; and
   means for lowering said one end of said transfer conveyor means and simultaneously lowering said support means from said raised position to said lowered position to transfer articles from said support means to said receiving conveyor means.

2. The combination as set forth in claim 1 wherein said support means is mounted on said transfer conveyor means adjacent the discharge end thereof for simultaneous movement therewith.

3. The combination as set forth in claim 2 including stop means movable from a position interrupting the flow of articles along said transfer conveyor means to a noninterrupting position; and means, responsive to the flow of articles along said transfer conveyor apparatus, for controlling the position of said stop means.

4. The combination as set forth in claim 3 wherein said responsive means includes magnetic field producing means for sensing the position of an article traveling on said transfer conveyor means, and means responsive to a fluctuation in the magnetic field resulting from the passage of an article within the influence of said magnetic field for controlling the position of said stop means.

5. The combination as set forth in claim 1 wherein said raising and lowering means includes magnetic field producing sensing means adjacent said transfer conveyor means for sensing the position of an article on said transfer conveyor means, and means responsive to a fluctuation in the magnetic field resulting from the passage of an article within the influence of said magnetic field for controlling said raising and lowering means.

6. The combination as set forth in claim 5 wherein said magnetic field producing means includes means for producing first and second magnetic fields, said responsive means including first and second means responsive to fluctuations in said first and second magnetic fields respectively, resulting from an article simultaneously passing to a position within the influence of said first and second magnetic fields for raising said one end of said transfer conveyor means and said support means, said first and second means being responsive to a fluctuation in one of said first and second magnetic fields resulting from an article passing beyond the influence of said one field for lowering said one end of said transfer conveyor means and said support means.

7. The combination of claim 5 including nonmagnetic mount means for mounting said magnetic field producing means.

8. The combination as set forth in claim 1 wherein said means for raising at least one end of said conveyor means comprises means for raising both ends.

9. The combination as set forth in claim 8 wherein said transfer conveyor means is disposed on one side of said receiving conveyor means, and pivotal mount means on the opposite side of said receiving conveyor means mounts said transfer conveyor means for pivotal movement.

10. The combination as set forth in claim 1 wherein said support means includes a support surface inclined upwardly and forwardly when said support means is in lowered position, and disposed in a substantially horizontal position when said support means is in said raised position.

11. The combination as set forth in claim 10 wherein the rear edge portion of said support surface is of gradually increased thickness and so inclines upwardly and forwardly in both raised and lowered positions.

12. The combination of claim 1 including outrigger plate means on said vertically movable transfer conveyor means adjacent said longitudinally extending receiving conveyor means and including a support surface disposed substantially flush with the upper conveying surface of said vertically movable transfer conveyor means.

13. The combination of claim 1 comprising control circuit means including means responsive to the operation of said receiving conveyor means, connected in circuit with said means for raising at least one end of said transfer conveyor means for selectively raising said one end of said transfer conveyor means to properly space said articles.

14. The combination of claim 13 wherein said responsive means includes cam means operable in response to movement of said receiving conveyor means for selectively opening and closing switch means connected in circuit with said means for raising said transfer conveyor means.

15. The combination of claim 14 including sensing means for sensing the presence of an article on said receiving conveyor means downstream of said transfer conveyor means connected in circuit with said means for raising said one end of said transfer conveyor means to prevent said transfer conveyor means from being moved to said raised position when articles are sensed by said sensing means.

* * * * *